US005618154A

United States Patent [19]

Irons, Jr. et al.

[11] Patent Number: 5,618,154

[45] Date of Patent: Apr. 8, 1997

[54] DRUM TRANSPORTER

[75] Inventors: A. Joseph Irons, Jr., Newark; Murphy Owens, Sr., Wilmington, both of Del.

[73] Assignee: Easy Lift Equipment Co., Inc., Newark, Del.

[21] Appl. No.: 315,300

[22] Filed: Sep. 29, 1994

[51] Int. Cl.[6] .................. B60P 3/00

[52] U.S. Cl. .................. 414/622; 414/673; 414/619

[58] Field of Search .................. 414/622, 618, 414/619, 623, 626, 453, 454, 444, 540; 187/229, 231, 232, 234, 230, 238, 404, 405; 254/2 R, DIG. 4

[56] References Cited

U.S. PATENT DOCUMENTS

| | | | |
|---|---|---|---|
| 2,708,048 | 5/1955 | Hopfeld | 414/619 |
| 2,905,347 | 9/1959 | Hopfeld | 414/622 |
| 3,358,863 | 12/1967 | Griffith et al. | 414/619 X |
| 4,130,212 | 12/1978 | Gatilao | 414/622 X |
| 4,279,348 | 7/1981 | Harper et al. | 414/673 X |
| 4,435,113 | 3/1984 | Mosely et al. | 414/622 X |
| 4,705,447 | 11/1987 | Smith | 414/673 X |
| 5,122,027 | 6/1992 | Tabayashi | 414/622 |
| 5,131,802 | 7/1992 | Sunami et al. | 414/673 X |
| 5,344,278 | 9/1994 | Emig, Jr. | 414/622 |

FOREIGN PATENT DOCUMENTS

| | | | |
|---|---|---|---|
| 122894 | 1/1920 | Australia | 414/618 |
| 2201658 | 9/1988 | United Kingdom | 414/673 |

OTHER PUBLICATIONS

Liftomatic Material Handling Inc.; Evanston, IL, "Junior Drum Handling Attachment" brochure, 1 page, 1991.

O & M Industrial Supply Ltd. brochure, Agincourt, Canada; 1 page; no date, "The Back Saver".

Lift Ó Matic Brochure; Liftomatic Material Handling Inc.; Evanston, IL; no date.

Osaka Taiyu Brochure, Jun. 1993; Osaka Taiyu Co., Mino–city, Osaka Japan, Roboter drum carrier model RC–01 and RC–02; 1 page.

*Primary Examiner*—David A. Bucci
*Assistant Examiner*—Stephen Gordon
*Attorney, Agent, or Firm*—Connolly, & Hutz

[57] ABSTRACT

A drum transporter includes a main frame mounted on wheels with an outer mast assembly extending generally horizontally from the main frame. The outer mast assembly includes a pair of legs disposed at an angle of at least about 90° with respect to each other so that the legs can straddle a pallet and dispose the main frame near a drum on the pallet. An upstanding post assembly extends upwardly from the main frame and includes a fixed guide post with an upper clamping mechanism for releasably engaging a chime of a drum. The upper clamping mechanism is mounted for vertical movement with respect to the fixed guide post. A stabilizing mechanism is also mounted for vertical movement with respect to the fixed guide post for contacting the drum at a location below and remote from the clamping mechanism. A lifting mechanism controls the vertical movement of the clamping mechanism and the stabilizing mechanism. The main frame is counter-balanced to minimize any tendency of the transporter to tip during the handling of a drum.

16 Claims, 4 Drawing Sheets

DRUM TRANSPORTER

BACKGROUND OF THE INVENTION

Various devices exist for transporting drums from one location to another. At times the drums are stored on a pallet or may be stored on the floor or other surface. The known form of devices generally includes a clamping mechanism which would engage the chime of a drum and also includes elements for contacting the drum below the clamping mechanism to stabilize the drum when it is lifted. Examples of commercial drum handling equipment include the DCMJ and DCM models of Liftomatic Material Handling, Inc. and the Roboter drum carrier of Osaka Taiyu Co., Ltd. The DCMJ and DCM models are attachments to a forklift. The Roboter drum carrier is a self-contained unit, but is constructed in a manner that it includes legs which are dimensioned and spaced with respect to each other whereby the legs could not conveniently straddle a pallet.

SUMMARY OF THE INVENTION

An object of this invention is to provide a self-contained drum transporter which could effectively handle drums located on a floor or on a pallet or on other surfaces.

A further object of this invention is to provide such a device which is capable of handling heavy drums while minimizing any tendency for the device to tip.

In accordance with this invention the self-contained drum transporter includes a main frame mounted on wheels. An outer mast assembly extends generally horizontally from the main frame and includes a pair of legs disposed at an angle of at least about 90° with respect to each other so that the legs may straddle a pallet and dispose the main frame near a drum on the pallet. An upstanding post assembly extends upwardly from the main frame at the outer mast assembly. The post assembly includes a fixed guide post. An upper clamping mechanism is movably mounted to the fixed post for engaging the chime of a drum. A stabilizing mechanism is movably mounted to the fixed post below the clamping mechanism for contacting the drum at a location below the clamping mechanism. A lifting mechanism controls the vertical movement of the upper clamping mechanism and of the stabilizing mechanism to permit a drum to be engaged by the transporter and then lifted and then conveyed from one location to another. The main frame comprises counter-balance means to minimize a tendency of the transporter to tip during the handling of the drum.

The main frame may include a compartment which can be exposed by selective detachment of a covering plate so that weights could be mounted in the compartment to assure its counter-balancing function. An outer sleeve assembly may be movably mounted to the fixed guide post with the clamping mechanism and the stabilizing mechanism attached to the outer sleeve assembly. The lifting mechanism is also attached to the outer sleeve assembly whereby actuating of the lifting mechanism causes the outer sleeve to move up or down.

A BRIEF DESCRIPTION OF THE DRAWINGS

DETAILED DESCRIPTION

Figure 1:
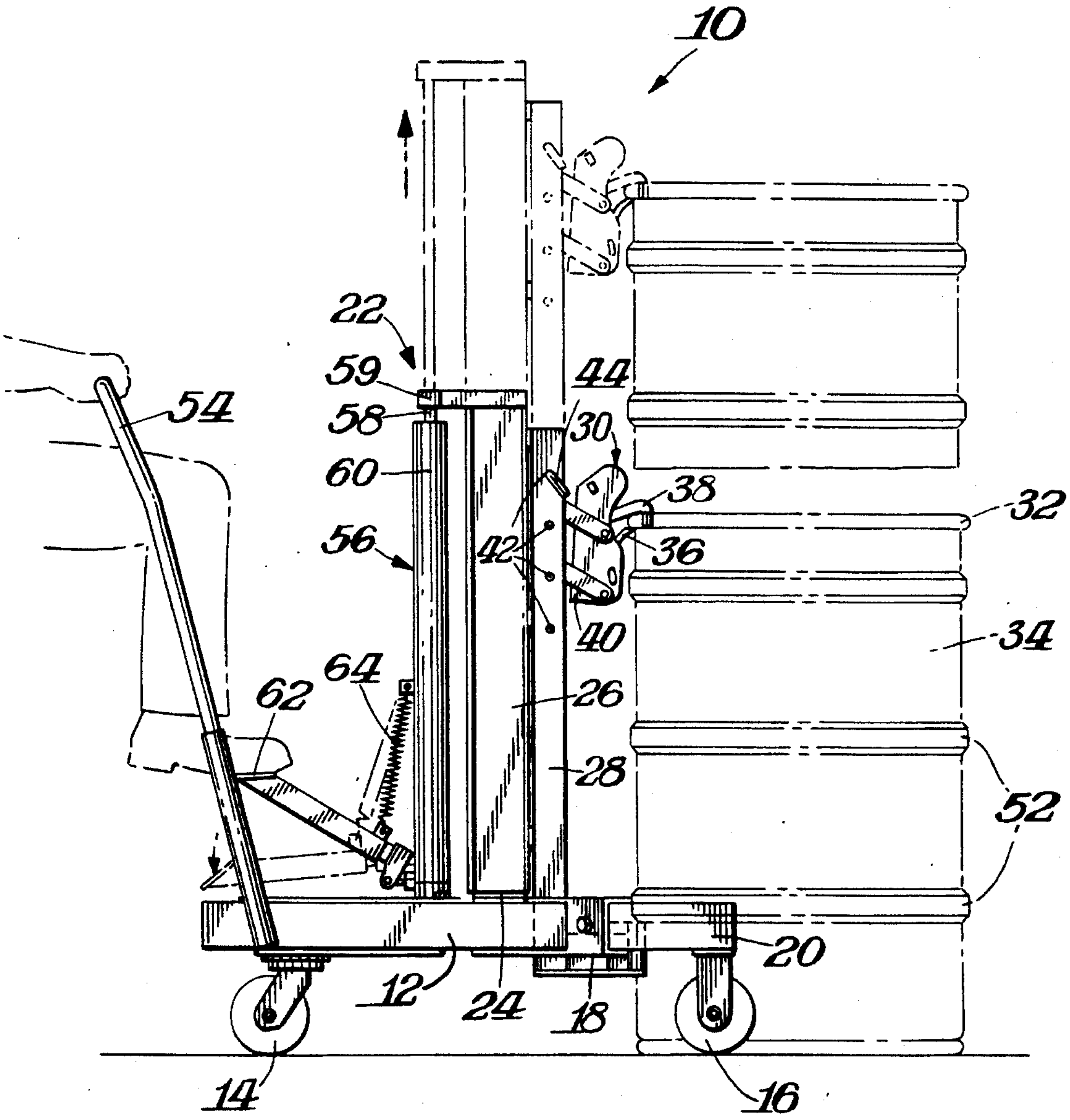
FIG. 1 is a side elevational view of a drum transporter in accordance with one embodiment of this invention.
Figure 3:
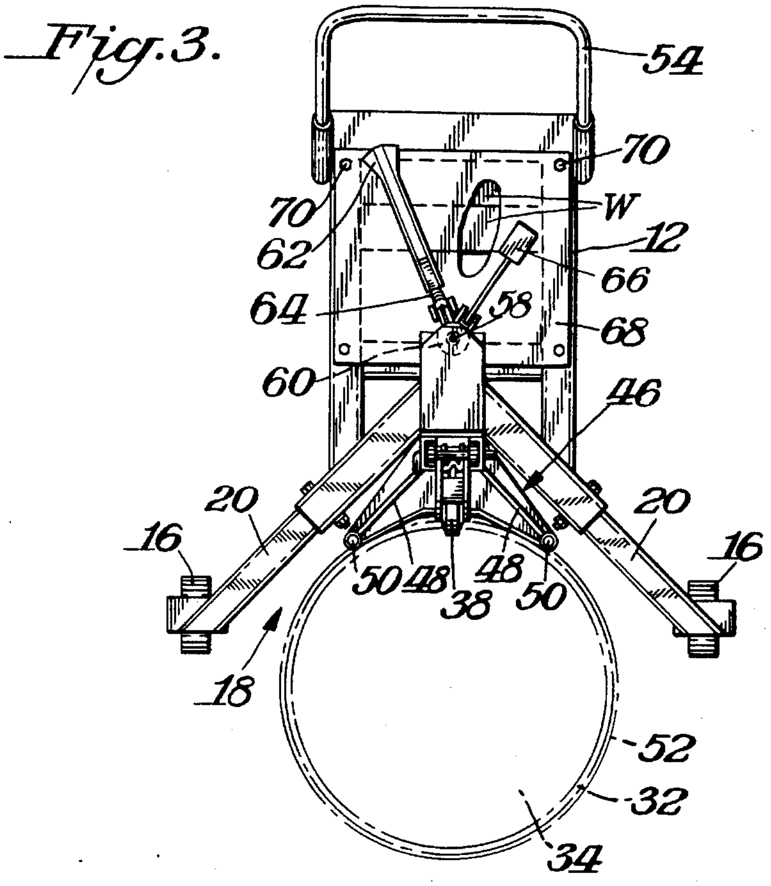
FIG. 3 is a top plan view of the transporter shown in FIG. 1–2.
Figure 2:
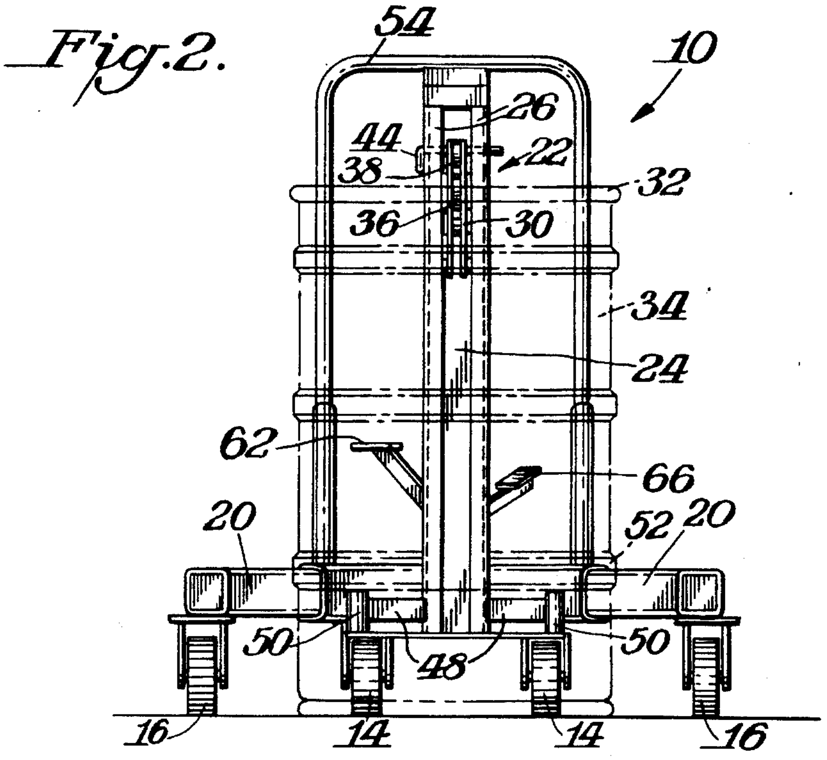
FIG. 2 is a side elevational view of the transporter shown in FIG. 1.

FIGS. 1–3 illustrate a transporter 10 in accordance with one embodiment of this invention. As shown therein transporter 10 includes a main frame 12 mounted on sets of wheels 14, 16. Rear wheels 16 are pivotally mounted below and to main frame 12 to facilitate the steering of the transporter 10. Wheels 16 are mounted below and to an outer mast assembly 18 which extends horizontally outwardly from the main frame 12. The forward wheels 16 are preferably fixed or non-pivotally mounted. Wheels 16 are preferably 5 inch solid kryptonic chemical resistant wheels with precision sealed ball bearings to provide easy rolling.

As shown in FIG. 2 the outer mast assembly 18 includes a pair of straddle legs 20 which are disposed at a 90° angle with respect to each other so that the legs may conveniently straddle the corner of a pallet. The spacing of the legs 20, 20 represents an important feature of this invention and should be such to permit the pallet straddling. Accordingly, the spacing should be at least about 90° with respect to each other. As the angle decreases below 90°, it is more difficult to straddle the pallet. As the angle increases beyond 90° however more room will be required to accommodate the legs.

Transporter 10 also includes an upstanding post assembly 22 which includes a fixed guide post 24. A sleeve assembly is mounted around fixed post 24. The sleeve assembly is formed as two C-shaped members 26, 26. As shown in FIG. 1, each sleeve 26 includes an extension member 28 to which an upper clamping mechanism 30 is detachably secured. Upper clamping mechanism 30 may be of any suitable construction capable of engaging the chime 32 of a drum 34. The invention may be practiced by using a "Parrot-Beak" type clamping mechanism manufactured by Liftomatic Material Handling, Inc. or by Morse Manufacturing Co. or by Kriegler Manufacturing Co. The clamping mechanism 30 includes a lower jaw 36 and a movable upper jaw 38 attached to a body structure 40. Extension members 28, 28 are provided with sets of aligned holes 42 to permit vertical adjustment of the location of mounting of clamp mechanism 30. Thus, as shown in FIGS. 1 and 2 a retainer pin 44 extends through a set of holes 42 and through clamp mechanism 30 to mount the clamp mechanism 30 to the sleeve 26. When it is desired to change the location of mounting, the retainer pin 44 is removed to permit the clamp mechanism 30 to be re-positioned and then re-attached to sleeves 26 by again inserting pin 44 through the appropriate set of holes 42 and the corresponding hole in clamp mechanism 30.

As best shown in FIG. 3, the stabilizing mechanism 46 is also mounted to sleeve 26. Stabilizing mechanism 46 includes a pair of horizontal arms 48 having vertically disposed pins 50 at their outer end for engagement under the annular ring 52 of drum 34.

In operation the user would grasp handle 54 at the rear end of main frame 12 and steer the transporter 10 to the barrel which is intended to be moved. If the barrel is on a pallet, as in FIGS. 4–5, the user would steer transporter 10 so that the legs 20,20 straddle the pallet. When positioning the transporter 10 the user would dispose the pins 50 under ring 52. Clamp mechanism 30 would be mounted to sleeves 26 at the proper location for engagement with chime 32. The engagement would be accomplished by disposing jaw 36 beneath chime 32 and then actuating movable jaw 38 in a known manner to engage the drum. The user then actuates a lifting mechanism 56 which is mounted to sleeve 26 for raising the sleeve 26 and thereby also raising the clamping mechanism 30 and the stabilizing mechanism 46. Because the drum is clamped by clamping mechanism 30 the drum 34 is also elevated. FIG. 1, for example, illustrates in solid lines, the initial engagement of transporter 10 with drum 34 while the drum is in its lowest position. FIG. 1 also illustrates in phantom, the corresponding components when the drum 34 is elevated.

Any suitable lifting mechanism may be used in accordance with this invention. In general, the lifting mechanism would incorporate a pair of telescopic members with some means to cause movement of the inner member and the outer tubular member with respect to each other and to transmit this up and down movement to the sleeve assembly 26 to thereby effect a corresponding vertical movement of the sleeves 26. If desired the members need not be telescopically mounted. Rather the members could simply be slidably mounted against each other.

FIG. 1 illustrates the members to be in the form of a hydraulic cylinder 60 having a piston 58 extending out of cylinder 60. A bracket 59 connects piston 58 to sleeves 26. A suitable hydraulic cylinder could be used such as the Star Hydraulic Foot Operated Lift Model HF500 from Star Hydraulics, Inc. The illustrated lift mechanism 56 also includes a foot operated lever 62 which is pumped to supply hydraulic fluid and thereby elevate piston 58 from cylinder 60. A return spring 64 is mounted between lever 62 and cylinder 60. As shown in FIGS. 2–3 a foot operated pedal 66 is also provided to actuate a release valve and permit the fluid to be returned so that the piston 58 may again be lowered into cylinder 60.

One of the features of transporter 10 is that main frame 12 is made of heavy duty material to function as counter-balance means and to minimize any tendency for transporter 10 to tip when it is lifting a drum and when it is moving the drum from one location to another. If necessary, the main frame 12 could be made heavier by the addition of weights on the side of the main frame opposite legs 20, 20. FIG. 3, for example, illustrates main frame 12 to include a top plate 68 which is detachably secured by fasteners 70 to permit the top plate 68 to be removed and thereby expose the interior of main frame 12. Removable weights W could be inserted into or removed from the interior to adjust the total weight of the main frame in accordance with the counter-balance force necessary. The heavier the main frame, the less likely would there be any tendency to tip. On the other hand, the heavier the main frame, the more difficult it is to push the transporter. Accordingly, the option of adjusting the total weight permits the proper balance necessary to minimize tipping while facilitating the movability of transporter 10. Capacity of device 10 is adjusted by extending or shortening of the legs 20. This is accomplished by forming legs 20 of telescopic members as shown in FIG. 3. Adjusting the length of legs 20 thus also functions to provide counterbalancing.

Figure 4:
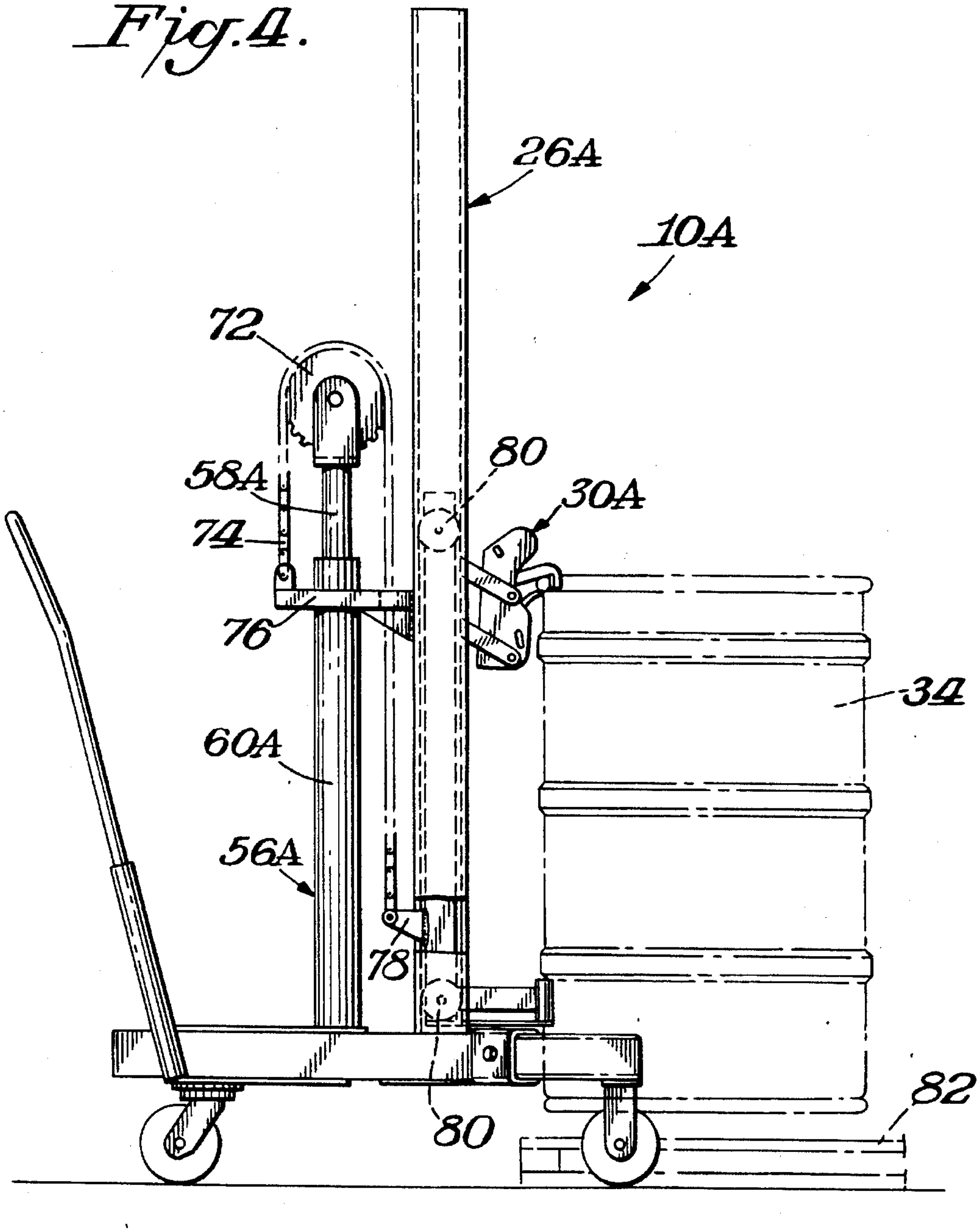
FIG. 4 is a side elevational view of a modified form of transporter in accordance with this invention.

FIG. 4 illustrates a modified transporter 10A using an alternative lifting assembly 56A. As shown therein, a sprocket 72 is mounted to the exposed top end of piston 58A. A chain 74 is secured at one end to bracket 76 on cylinder 60A while the other end of the chain 74 is secured to bracket 78 mounted to the sleeves 26A and thereby facilitate the up and down movement of sleeves 26A. This differs from the transporter 10 where the upper end of piston 58 is secured directly to the sleeve 26 by the connecting bracket 59.

FIG. 4 also illustrates the inclusion of rollers 80 within the sleeve 26A to facilitate the up and down movement. FIG. 4 also illustrates upper clamping mechanism 30A.

FIG. 1 shows the drum 34 to be mounted directly on a floor. FIG. 4, however, illustrates the drum 34 to be mounted on a pallet 82.

Figure 5:
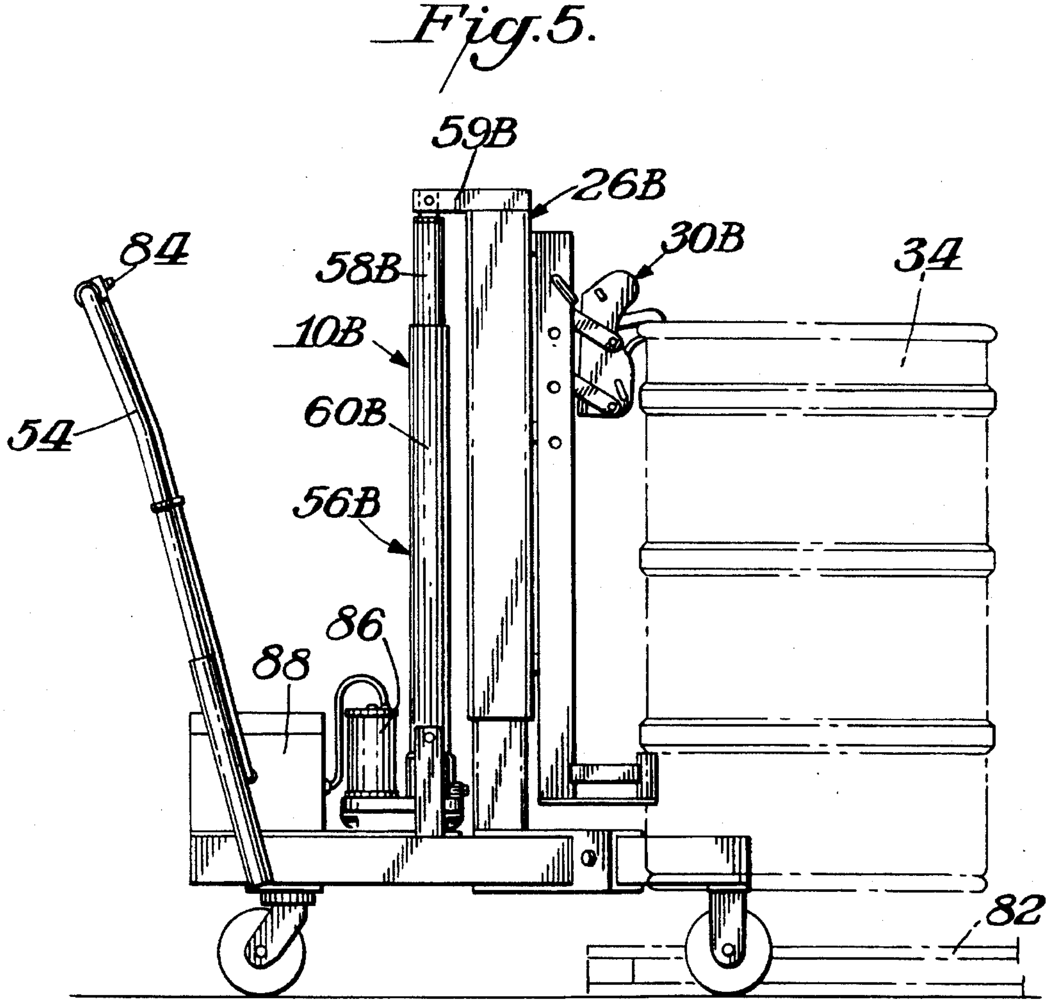
FIG. 5 is a side elevational view of yet another form of transporter in accordance with this invention.

FIG. 5 illustrates a transporter 10B utilizing an electronic lifting mechanism 56B. As shown therein a screw actuator is mounted within outer cylinder 60B. Screw actuator may be of a known type such as a PPA Linear Actuator. Control of movement of the inner telescopic member 58B is achieved by means of a switch 84 on handle 54. Switch 84 actuates motor 86 which is powered by battery pack 88. Extension member 58B is mounted by bracket 59B to sleeves 26B for raising and lowering the sleeve.

FIG. 5 also illustrates upper clamping mechanism 30B.

In each of the embodiments, the fixed post 24 serves as a guide member to facilitate the proper vertical movement of the clamping mechanism and stabilizing mechanism.

It is to be understood that various features shown with respect to any embodiment may be used with other embodiments within the spirit of this invention.

The transporter of this invention provides a safe ergonomically designed manner to move any size drum on or off pallets, scales, or containment pallets and move them around a plant. The transporter eliminates risks of injury normally associated with handling drums using conventional drum trucks. The transporter of this invention thus avoids strained backs or pinched fingers. The user simply need push the easy rolling transporter until the clamping mechanism contacts the drum. Then the user actuates the lifting mechanism to lift the drum and move the drum to its desired location.

What is claimed is:

1. A self-contained drum transporter comprising a main frame, said main frame having a loading end and a steering end remote from said loading end, a set of wheels mounted to and below said main frame for facilitating the movement of said main frame from one location to another, an outer mast assembly extending generally horizontally from said main frame at said loading end, said outer mast assembly including a pair of legs at said loading end, an upstanding post assembly extending upwardly from said main frame at said outer mast assembly, each of said legs having a longitudinal centerline, extensions of said longitudinal centerlines intersecting generally at said post assembly to form an angle between said legs such that a generally V-shaped spacing between said legs is formed at said loading end, said angle being about 90° with respect to said legs to permit said legs to straddle and be disposed generally against a perpendicular corner of a pallet and to dispose said main frame near a drum to be selectively transported on and off the pallet, said post assembly including a fixed guide post, an upper clamping mechanism for releasably engaging the chime of a drum, said upper clamping mechanism being movably mounted to said fixed guide post and being disposed in said spacing between said legs for selective vertical movement up and down with respect to said fixed guide post, a stabilizing mechanism for contacting the drum at a location below and remote from said upper clamping mechanism, said stabilizing mechanism being movably mounted to said fixed guide post and being disposed in said spacing between said legs for selective vertical movement up and down with respect to said fixed guide post, said spacing being free of any structure outwardly of said upper clamping mechanism and said stabilizing mechanism, the length of said main frame from said steering end to the loading end side of said guide post being longer than the distance said legs extend outwardly from said loading end side of said guide post, said legs being adjustable in length, a lifting mechanism selectively controlling the vertical movement of said upper clamping mechanism and of said stabilizing mechanism to thereby permit a drum on a pallet to be engaged by said transporter and then be conveyed from one location to another, said main frame having a compartment at said steering end with said post assembly being between said compartment and said outer mast assembly, and said main frame comprising counterbalance means including weights in said compartment to minimize any tendency of said transporter to tip during the handling of a drum.

2. The transporter of claim 1 wherein the adjustability of said legs allows for accommodation of different size drums.

3. The transporter of claim 2 wherein said post assembly includes an outer sleeve assembly movably mounted to said fixed guide post, and said clamping mechanism and said stabilizing mechanism being attached to said sleeve assembly.

4. The transporter of claim 3 wherein said clamping mechanism is adjustably mounted to said sleeve assembly selectively at different vertical positions.

5. The transporter of claim 4 wherein said clamping mechanism includes a fixed jaw for being disposed under a chime of a drum and a movable locking jaw for being disposed above the chime of the drum.

6. The transporter of claim 4 wherein said stabilizing mechanism includes a plurality of horizontal arms, and each of said arms terminating in a vertical pin for being disposed under a ring on the drum.

7. The transporter of claim 4 wherein said lifting mechanism comprises an outer tubular member and an inner member telescopically mounted in said outer tubular member, and said sleeve assembly being attached to one of said members.

8. The transporter of claim 7 wherein said tubular and inner members comprise a hydraulic piston and cylinder mechanism.

9. The transporter of claim 8 wherein said lifting mechanism includes an actuating pedal for causing hydraulic fluid to extend said piston out of said cylinder, and a release pedal for permitting said piston to retract back into said cylinder.

10. The transporter of claim 9 including an upstanding handle mounted to said main frame remote from said legs, said set of wheels including rear pivotable wheels mounted to said main frame below said handle, and front fixed wheels mounted to said legs.

11. The transporter of claim 1 wherein said post assembly includes an outer sleeve assembly movably mounted to said fixed guide post, and said clamping mechanism and said stabilizing mechanism being attached to said sleeve assembly.

12. The transporter of claim 11 wherein said clamping mechanism is adjustably mountable to said sleeve assembly at different vertical locations on said sleeve assembly.

13. The transporter of claim 11 wherein said lifting mechanism includes a chain mounted to said sleeve assembly, said chain being mounted partially around a sprocket, and a drive assembly connected to said chain for moving said chain over said sprocket for selectively raising and lowering said sleeve assembly.

14. The transporter of claim 1 wherein said post assembly includes a sleeve assembly movably mounted around said fixed guide post, said lifting mechanism comprising an outer tubular member and an inner member telescopically mounted in said tubular member, and said sleeve assembly being attached to one of said members.

15. A self-contained drum transporter comprising a main frame, a set of wheels mounted to and below said main frame for facilitating the movement of said main frame from one location to another, an outer mast assembly extending generally horizontally from said main frame, said outer mast assembly including a pair of legs, said legs being disposed at an angle of at least about 90° with respect to each other to permit said legs to straddle a pallet and dispose said main frame near a drum to be transported, an upstanding post assembly extending upwardly from said main frame at said outer mast assembly, said post assembly including a fixed guide post, an upper clamping mechanism for releasably engaging the chime of a drum, said upper clamping mechanism being movably mounted to said fixed guide post for selective vertical movement up and down with respect to said fixed guide post, a stabilizing mechanism for contacting the drum at a location below and remote from said upper clamping mechanism, said stabilizing mechanism being movably mounted to said fixed guide post for selective vertical movement up and down with respect to said fixed guide post, a lifting mechanism selectively controlling the vertical movement of said upper clamping mechanism and of said stabilizing mechanism to thereby permit a drum to be engaged by said transporter and then be conveyed from one location to another, said main frame comprising counterbalance means to minimize any tendency of said transporter to tip during the handling of a drum, said counterbalance means including removable weights at said main frame for varying the total weight of said main frame, said main frame including a compartment closed by a removable plate whereby said plate may be detached to expose said compartment, and said weights being located in said compartment.

16. A self-contained drum transporter comprising a main frame, a set of wheels mounted to and below said main frame for facilitating the movement of said main frame from one location to another, an outer mast assembly extending generally horizontally from said main frame, said outer mast assembly including a pair of legs said legs being disposed at an angle of at least about 90° with respect to each other to permit said legs to straddle a pallet and dispose said main frame near a drum to be transported, an upstanding post assembly extending upwardly from said main frame at said outer mast assembly, said post assembly including a fixed guide post, an upper clamping mechanism for releasably engaging the chime of a drum, said upper clamping mechanism being movably mounted to said fixed guide post for selective vertical movement up and down with respect to said fixed guide post, a stabilizing mechanism for contacting the drum at a location below and remote from said upper clamping mechanism, said stabilizing mechanism being movably mounted to said fixed guide post for selective vertical movement up and down with respect to said fixed guide post, a lifting mechanism selectively controlling the vertical movement of said upper clamping mechanism and of said stabilizing mechanism to thereby permit a drum to be engaged by said transporter and then be conveyed from one location to another, said main frame comprising counterbalance means to minimize any tendency of said transporter to tip during the handling of a drum, said legs being adjustable in length, said post assembly including an outer sleeve assembly movably mounted to said fixed guide post, said clamping mechanism and said stabilizing mechanism being attached to said sleeve assembly, and said sleeve assembly comprising two C-shaped sleeves.

* * * * *